United States Patent

Takamura et al.

(10) Patent No.: US 9,268,603 B2
(45) Date of Patent: Feb. 23, 2016

(54) VIRTUAL MACHINE MANAGEMENT DEVICE, AND VIRTUAL MACHINE MOVE CONTROL METHOD

(71) Applicant: FUJITSU LIMITED, Kawasaki-shi, Kanagawa (JP)

(72) Inventors: Tatsushi Takamura, Sagamihara (JP); Tomohiro Takahashi, Kawasaki (JP); Kenichirou Shimogawa, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 129 days.

(21) Appl. No.: 14/203,756

(22) Filed: Mar. 11, 2014

(65) Prior Publication Data

US 2014/0196041 A1 Jul. 10, 2014

Related U.S. Application Data

(63) Continuation of application No. PCT/JP2011/071151, filed on Sep. 15, 2011.

(51) Int. Cl.
| G06F 9/48 | (2006.01) |
| G06F 9/50 | (2006.01) |
| G06F 9/455 | (2006.01) |
| H04L 29/08 | (2006.01) |

(52) U.S. Cl.
CPC .......... *G06F 9/4856* (2013.01); *G06F 9/45533* (2013.01); *G06F 9/5088* (2013.01); *G06F 2009/4557* (2013.01); *G06F 2209/502* (2013.01); *H04L 67/1021* (2013.01)

(58) Field of Classification Search
None
See application file for complete search history.

(56) References Cited

U.S. PATENT DOCUMENTS

2007/0226449 A1 9/2007 Akimoto
2011/0225277 A1* 9/2011 Freimuth ............ G06F 9/45558
709/223

FOREIGN PATENT DOCUMENTS

| EP | 2323036 | 5/2011 |
| JP | 2005-4676 A | 1/2005 |
| JP | 2007-257097 | 10/2007 |
| JP | 2008-042665 | 2/2008 |
| JP | 2010-140134 | 6/2010 |
| JP | 2010-218307 | 9/2010 |

(Continued)

OTHER PUBLICATIONS

Meng et al., "Improving the Scalability of Data Center Networks with Traffic-aware Virtual Machine Placement", Mar. 2010.*
International Search Report, mailed in connection with PCT/JP2011/071151 and mailed Dec. 6, 2011.

(Continued)

*Primary Examiner* — Qing Wu
(74) *Attorney, Agent, or Firm* — Fujitsu Patent Center

(57) ABSTRACT

A virtual machine management device includes an acquiring unit, a specifying unit, and a move processing unit. The acquiring unit acquires an amount of communication data that is exchanged between multiple virtual machines running in multiple server devices and that is used for communication with each other. The specifying unit specifies, on the basis of the communication distance between each of the server devices, a server device that has a shorter communication distance from a server device, which executes one of a pair of the virtual machines whose amount of the communication data is equal to or greater than a predetermined amount, than a communication distance between the server devices in which the pair of the virtual machines are running. The move processing unit moves the other one of the pair of the virtual machines to the specified server device.

7 Claims, 9 Drawing Sheets

(56) References Cited

FOREIGN PATENT DOCUMENTS

| | | |
|---|---|---|
| JP | 2011-028408 | 2/2011 |
| WO | 2010/016104 | 2/2010 |

OTHER PUBLICATIONS

Japanese Office Action mailed Mar. 3, 2015 for corresponding Japanese Patent Application No. 2013-533418, with Partial English English Translation, 5 pages.

* cited by examiner

FIG.3

| COMMUNICATION SOURCE VIRTUAL SERVER NAME | COMMUNICATION DESTINATION VIRTUAL SERVER NAME | DISTANCE | AMOUNT OF COMMUNI-CATION DATA |
|---|---|---|---|
| A | B | 5 | 100 |
| | C | 3 | 200 |
| | D | 3 | 300 |

FIG.4

| SERVER DEVICE NAME | VM HOST NAME | VM GUEST NAME |
|---|---|---|
| PM1 | a | B |
| PM2 | b | A |
| PM3 | c | C<br>D |

FIG.5

| COMMUNICATION SOURCE VIRTUAL SERVER NAME | COMMUNICATION DESTINATION VIRTUAL SERVER NAME | DISTANCE | AMOUNT OF COMMUNI-CATION DATA |
|---|---|---|---|
| A | B | 5 | 100 |
|  | C | 3 | 200 |
|  | D | 3 | 300 |
| B | A | 5 | 100 |
|  | D | 10 | 500 |
| C | A | 3 | 200 |
| D | A | 3 | 300 |
|  | B | 10 | 500 |

FIG.6

| SERVER NAME | SERVER NAME | DISTANCE |
|---|---|---|
| PM1 | PM2 | 5 |
| PM1 | PM3 | 10 |
| PM2 | PM3 | 3 |

VIRTUAL MACHINE MANAGEMENT DEVICE, AND VIRTUAL MACHINE MOVE CONTROL METHOD

CROSS-REFERENCE TO RELATED APPLICATIONS

This application is a continuation of International Application No. PCT/JP2011/071151, filed on Sep. 15, 2011, and designated the U.S., the entire contents of which are incorporated herein by reference.

FIELD

The embodiments discussed herein are related to a virtual machine management device, and a virtual machine move control method.

BACKGROUND

In recent years, a virtualization technology that operates virtual machines in physical servers is used. For example, in each data center, an environment in which virtual machines are operated in multiple physical servers by using virtualization software is increased. The virtualization software has the function of moving a virtual machine running on a physical server to another physical server. This moving of a virtual machine is also referred to as "migration".

As a technology for distributing the load on the multiple physical servers in which the virtual machines are running, there is a method of migrating a virtual machine from, for example, a physical server to which a high load is applied to a physical server to which a low load is applied. Furthermore, as a technology for distributing the load, there is a proposed technology that uses, as a condition, at least one of the electrical power consumption and the amount of I/O; that calculates a cost for each pattern for multiple calculating processes that are distributed to multiple virtual machines; and that selects a pattern for the lowest cost.

Patent Literature 1: Japanese Laid-open Patent Publication No. 2010-218307

The conventional technology can distribute the load such that the load is not applied to a specific physical server; however, there is a problem in that, when virtual machines communicate and the communication distance between the virtual machines is great, the traffic in a network increases and thus a delay may possibly occur in the network.

SUMMARY

According to an aspect of an embodiment, a virtual machine management device includes an acquiring unit that acquires an amount of communication data that is exchanged between multiple virtual machines running in multiple server devices and that is used for communication with each other; a specifying unit that specifies, on the basis of a communication distance between each of the server devices, a server device that has a shorter communication distance from a server device, which executes one of a pair of the virtual machines whose amount of the communication data acquired by the acquiring unit is equal to or greater than a predetermined amount, than a communication distance between server devices in which the pair of the virtual machines are running; and a move processing unit that moves the other one of the pair of the virtual machines to the server device that has been specified by the specifying unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a schematic diagram illustrating an example of the configuration of data in a first table stored in a storing unit in a server device;

FIG. 4 is a schematic diagram illustrating an example of the configuration of data in a second table in a storing unit in a management server;

FIG. 5 is a schematic diagram illustrating an example of the configuration of data in a third table in the storing unit in the management server;

FIG. 6 is a schematic diagram illustrating an example of the results in which the communication distances between server devices are specified;

DESCRIPTION OF EMBODIMENTS

Preferred embodiments of the present invention will be explained with reference to accompanying drawings.

The present invention is not limited to these embodiment. Furthermore, the embodiments can be appropriately used in combination as long as the processes do not conflict with each other.

[a] First Embodiment

Figure 1:
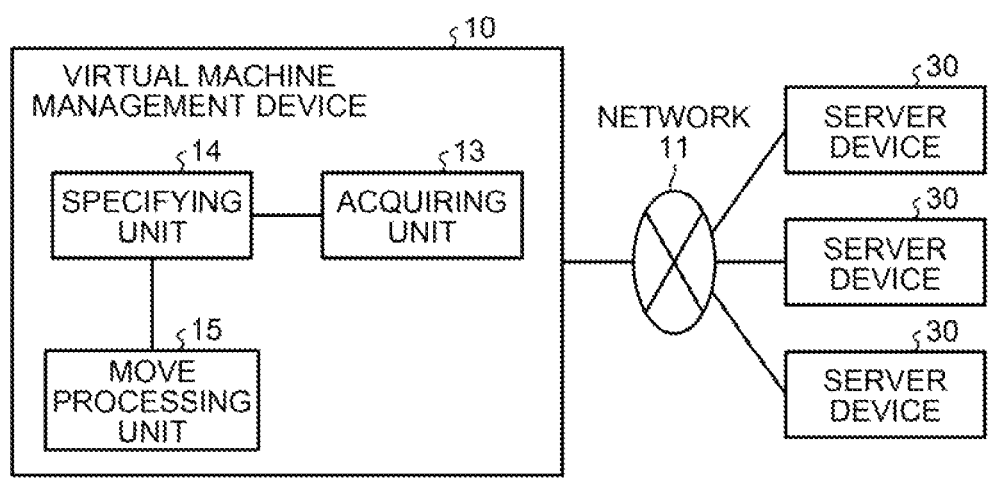
FIG. 1 is a schematic diagram illustrating the overall configuration of a system that includes server devices.

In the following, a virtual machine management device 10 according to a first embodiment will be described. FIG. 1 is a schematic diagram illustrating the overall configuration of a system that includes server devices. The virtual machine management device 10 is a physical server that manages virtual machines, which are virtualized computers and are running in multiple server devices 30. The virtual machine management device 10 is, for example, a management server computer that is installed in a data center or each corporation. The virtual machine management device 10 communicates with the server devices 30 via a network 11. The server device 30 executes virtualization software and operates a virtual machine on the virtualization software. Furthermore, the server devices 30 can migrate, with each other, a virtual machine via the network 11. Any kind of communication network, such as the Internet, a local area network (LAN), a virtual private network (VPN), or the like, may be used as the network 11 irrespective of whether the network is wired or wireless.

As illustrated in FIG. 1, the virtual machine management device 10 includes an acquiring unit 13, a specifying unit 14, and a move processing unit 15.

The acquiring unit 13 acquires various kinds of information from the server devices 30. For example, by receiving information on an amount of communication data that is sent from the server device 30 and that is exchanged between virtual machines for communicating with each other, the acquiring unit 13 acquires the amount of the communication data that is exchanged between the virtual machines for communicating with each other.

The specifying unit 14 specifies a server device that corresponds to the move destination of the virtual machine. For example, the specifying unit 14 obtains a pair of virtual machines in which the amount of communication data is equal or greater than a predetermined amount. The predetermined amount may also be defined as a fixed value, such as 200 bytes. Furthermore, the predetermined amount may also be defined as a constant rate of the total amount of communication data transmitted in the network 11. Furthermore, the predetermined amount may also be changed in accordance with the state of the traffic in the network 11. For example, a small value may be used if the traffic in the network 11 is high and a large value may be used if the traffic in the network 11 is low. In this way, by obtaining a pair of virtual machines in which the amount of communication data is equal to or greater than a predetermined amount, a virtual machine to which a high load is applied in the network 11 can be extracted as a candidate for a migration. The specifying unit 14 specifies, on the basis of the communication distance between the server devices 30, one of the server devices 30 in which the communication distance from the server device 30 that executes one of an obtained pair of virtual machines is smaller than the communication distance between the server devices 30 in which the pair of the virtual machines are running.

The communication distance between each of the server devices 30 may also be set by an administrator. Furthermore, the communication distance between each of the server devices 30 may also be specified on the basis of information acquired from each of the server devices 30. For example, the specifying unit 14 may also instruct each of the server devices 30 to measure the communication distance from the other one of the server devices 30 and specify, on the basis of information that indicates the communication distance responded from each of the server devices 30, the communication distance from the other one of the server devices 30. If the information that indicates the communication distance can be obtained from each of the server devices 30, the specifying unit 14 does not need to instruct to each of the server devices 30 to measure the communication distance. An example of the communication distance includes a hop count. The hop count mentioned here means the number of relay devices, such as routers, through which a packet passes until the packet reaches the communication destination. If a communication path is formed by multiple networks that are connected by routers, the communication state of each network may differ. Furthermore, as the number of routers increases, the number of times of relaying communication data increases and thus the length of the processing time taken to relay the communication data becomes long. Consequently, as the number of routers to be relayed, a delay in a network or a data loss tends to occur. Specifically, a delay or a data loss tends to occur as the number of hop counts increases. Consequently, a hop count may be used as information that represents the communication distance in a network. The hop count can be measured by sending, for example, Packet Internet Groper (PING) to the counterpart for the communication by sequentially increasing a count of Time To Live (TTL) starting from 1.

The move processing unit 15 executes a process that moves a virtual machine. For example, the move processing unit 15 executes a process that moves the other one of the pair of the virtual machines to the server device 30 specified by the specifying unit 14. The process that moves a virtual machine is a process that instructs, when, for example, virtualization software running on each of the server devices 30 moves a virtual machine, the server devices 30 at the move source and the move destination of a virtual machine to move. Furthermore, for example, by changing information related to the virtual machines managed by the virtual machine management device 10, the process also updates information related to a virtual machine such that the virtual machine operates in the server device 30 at the move destination if a virtual machine is moved. In the example illustrated in FIG. 1, because the functional configuration is illustrated, the acquiring unit 13, the specifying unit 14, and the move processing unit 15 are separately illustrated; however, for example, they may also be integrated as a single device. An example of the device includes an electronic circuit, such as a central processing unit (CPU), a micro processing unit (MPU), or the like. Furthermore, an integrated circuit, such as an application specific integrated circuit (ASIC), a field programmable gate array (FPGA), or the like, may also be used as the device.

As described above, the virtual machine management device 10 acquires the amount of communication data that is exchanged between multiple virtual machines, which are running on the multiple server devices 30, for communicating with each other. Furthermore, the virtual machine management device 10 acquires a pair of virtual machines in which the amount of communication data is equal to or greater than a predetermined amount. The virtual machine management device 10 specifies, on the basis of the communication distance between each of the server devices 30, one of the server devices 30, that has a shorter communication distance from the server device 30, which executes one of the pair of the virtual machines, than the communication distance between the server devices 30 in which the pair of the virtual machines are running. Then, the virtual machine management device 10 executes a process that moves the other one of the pair of the virtual machines to the specified one of the pair of the server devices 30. Consequently, the other virtual machine is moved to the specified server device 30 and thus the communication distance between the server devices 30 that include the pair of the virtual machines in which the amount of communication data is equal to or greater than the predetermined amount becomes short. Thus, because communication data is not transmitted between the pair of the virtual machines, which is a part in the network 11, the amount of the traffic is reduced in the entirety of the network 11. Consequently, the virtual machine management device 10 can suppress the occurrence of a delay in the network 11. Furthermore, because a virtual machine is moved, the communication distance between the server devices 30 in which a pair of virtual machines are running becomes short and thus a delay in the network 11 or a data loss is less likely to occur. Consequently, a pair of virtual machines can perform communication in a stable manner.

[b] Second Embodiment

Figure 2:
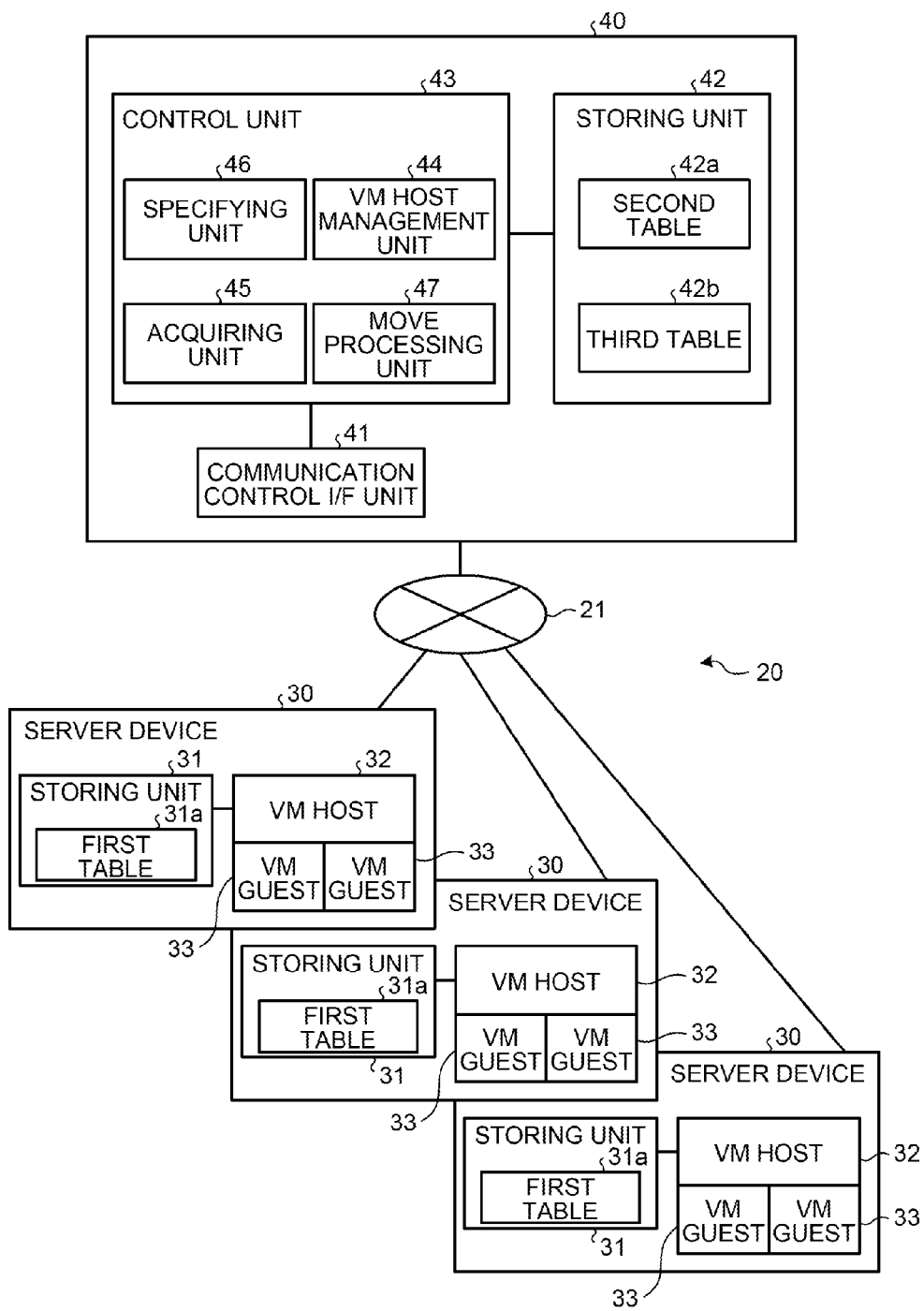
FIG. 2 is a schematic diagram illustrating an example of the functional configuration of a system according to a second embodiment.

In the following, a second embodiment will be described. In the second embodiment, a description will be given of a system 20 in which VM guests 33, which are virtual machines, are running in each of multiple server devices 30 and are managed by a management server 40. FIG. 2 is a schematic diagram illustrating an example of the functional configuration of a system according to a second embodiment. The system 20 includes the multiple server devices 30 and the management server 40. Each of the server devices 30 is connected to the management server 40 via a network 21. An example of the network 21 includes any kind of communication network, such as the Internet, a LAN, a VPN, or the like, irrespective of whether the network is wired or wireless.

The server device 30 is a device that can operate the VM guests 33, which are virtual machines, and that migrates one of the VM guests 33 to the other server device 30. The management server 40 manages the VM guest 33 that are running on each of the server devices 30 and instructs each of the server devices 30 to migrate the VM guest 33. This migration instruction includes information related to the VM guest 33 that is targeted for a migration or includes information that indicates the move source, the move destination, or the like. In the example illustrated in FIG. 2, the number of server devices 30 are three; however, the number of server devices 30 may also be two or may also be four or more. Furthermore, FIG. 2 illustrates a single management server 40 as an example; however, the number of the management servers 40 may also be two or more.

As illustrated in FIG. 2, each of the server devices 30 includes a storing unit 31 and a VM host 32.

The storing unit 31 stores therein various kinds of information. For example, the storing unit 31 stores therein a first table 31a. An example device of the storing unit 31 includes a semiconductor memory capable of rewriting data, such as a flash memory, a non-volatile static random-access memory (NVSRAM), and the like, or a storage device, such as a hard disk, an optical disk, and the like.

The first table 31a is a table that manages the communication distance between each of the VM guests 33 measured by the VM host 32, which will be described later, and that manages the amount of communication data. FIG. 3 is a schematic diagram illustrating an example of the configuration of data in a first table stored in a storing unit in a server device. As illustrated in FIG. 3, the first table 31a includes therein items, such as the communication source virtual server name, the communication destination virtual server name, the distance, and the amount of communication data. The item of the communication source virtual server name is an area that stores therein the name of the VM guest 33 that corresponds to the communication source. The item of the communication destination virtual server name is an area that stores therein the name of the VM guest 33 that corresponds to the communication destination. The item of the distance is an area that stores therein the communication distance between the VM guests 33 that communicates with each other. In the second embodiment, a hop count is stored as the communication distance. The item of the amount of communication data is an area that stores therein the amount of communication data between the VM guests 33 that communicates with each other. For example, the amount of the communication data may also be represented in bit units or in byte units. Furthermore, the amount of communication data may also be represented by, for example, per unit time, such as bits per second (bps). In the second embodiment, the item of the amount of communication data is represented in kilo bit units.

The example illustrated in FIG. 3 indicates that the VM guest 33 named "A" communicates with the VM guest 33 named "B", indicates that the communication distance therebetween is "5", and indicates that the amount of the communication data is "100". Furthermore, the example illustrated in FIG. 3 indicates that the VM guest 33 named "A" communicates with the VM guest 33 named "C", indicates that the communication distance therebetween is "3", and indicates that the amount of the communication data is "200". Furthermore, the example illustrated in FIG. 3 indicates that the VM guest 33 named "A" communicates with the VM guest 33 named "D", indicates that the communication distance therebetween is "3", and indicates that the amount of the communication data is "300".

The VM host 32 is a control program for virtualization software that virtually implements an operating environment of a computer system and controls the operation of the VM guest 33. Furthermore, the VM host 32 controls, in accordance with a migration instruction received from the management server 40, a migration of one of the VM guests 33 with one of the other server devices 30. The VM guests 33 are virtual machines that execute a process requested by a user in an environment that is provided by the VM host 32. The VM guests 33 execute a program, such as an application or firmware, in a virtual environment. Furthermore, the VM guests 33 can communicate with the other VM guests 33. Each of the VM hosts 32 in the corresponding server devices 30 monitors the communication state of each of the running VM hosts 32 and measures a hop count between each of the VM hosts 32 and the other VM host 32. Furthermore, each of the VM hosts 32 measures the amount of communication data exchanged between each of the VM hosts 32 and the other VM host 32 in a predetermined time period. The predetermined time period mentioned here is not particularly limited as long as the average amount of communication data exchanged between each of the VM guests 33 can be measured. For example, the time period may also be several seconds or several minutes. A hop count or the amount of communication data may be measured at predetermined time intervals, such as every day or every week, or may be measured at the timing at which an instruction to measure the amount of communication data is received from the server device 30. The VM host 32 stores, in the first table 31a, the measured hop count and the measured amount of communication data between the VM guests 33. Furthermore, the VM host 32 sends the measured hop count and the amount of the communication data to the management server 40. After the completion of the sending of the measured hop count and the amount of the communication data, the VM host 32 deletes the hop count and the amount of the communication data stored in the first table 31a.

The management server 40 includes a communication control I/F unit 41, a storing unit 42, and a control unit 43.

The communication control I/F unit 41 is an interface that includes at least one port and that controls communication between each of the server devices 30 and the management server 40. For example, the communication control I/F unit 41 sends, to the server device 30, an instruction to migrate one of the VM guests 33. Furthermore, the communication control I/F unit 41 receives a hop count and the amount of communication data between each of the VM guests 33 that are sent from the VM hosts 32 in each of the corresponding server devices 30.

The storing unit 42 stores therein various kinds of information. For example, the storing unit 42 stores therein a second table 42a and a third table 42b. An example of the storing unit 42 includes a semiconductor memory that can rewrite data, such as a flash memory, an NVSRAM, and the like, or a storage device, such as a hard disk, an optical disk, and the like.

The second table 42a is a table that manages the VM hosts 32 and the VM guests 33 managed by the management server

40. FIG. 4 is a schematic diagram illustrating an example of the configuration of data in a second table in a storing unit in a management server. As illustrated in FIG. 4, the second table 42a includes items, such as the server device name, the VM host name, and the VM guest name. The item of the server device name is an area that stores therein the name of each of the server devices 30. The item of the VM host name is an area that stores therein the name of each of the VM hosts 32 running in the corresponding server devices 30. The item of the VM guest name is an area that stores therein the name of each of the VM guests 33 running in the corresponding VM guests 33.

The example illustrated in FIG. 4 indicates that, in the server device 30 named "PM1", the VM host 32 named "a" is running and indicates that the VM guest 33 named "B" is running on that VM host 32. Furthermore, the example illustrated in FIG. 4 indicates that, in the server device 30 named "PM2", the VM host 32 named "b" is running and indicates that the VM guest 33 named "A" is running on that VM host 32. Furthermore, the example illustrated in FIG. 4 indicates that, in the server device 30 named "PM3", the VM host 32 named "c" is running and indicates that the VM guest 33 named "C" and the VM guest 33 named "D" are running on that VM host 32.

The third table 42b is a table that manages a hop count and the amount of communication data between each of the VM guests 33 received from the VM host 32 in each of the corresponding server devices 30. FIG. 5 is a schematic diagram illustrating an example of the configuration of data in a third table in the storing unit in the management server. As illustrated in FIG. 5, similarly to the first table 31a illustrated in FIG. 3, the third table 42b includes items, such as the communication source virtual server name, the communication destination virtual server name, the distance, and the amount of communication data. The items are the same as those in the first table 31a; therefore, descriptions thereof will be omitted.

The example illustrated in FIG. 5 indicates that, for the data on the VM guest 33 that is the communication source named "A", the same data as that illustrated in FIG. 3 is stored. Furthermore, in the example illustrated in FIG. 5, data on the VM guests 33 that are the communication source named "B", "C", and "D" are also stored. The example illustrated in FIG. 5 indicates that the VM guest 33 named "B" communicates with the VM guest 33 named "A", indicates that the communication distance therebetween is "5", and indicates that the amount of the communication data is "100". Furthermore, the example illustrated in FIG. 5 indicates that the VM guest 33 named "B" communicates with the VM guest 33 named "D", indicates that the communication distance therebetween is "10", and indicates that the amount of the communication data is "500". Furthermore, the example illustrated in FIG. 5 indicates that the VM guest 33 named "C" communicates with the VM guest 33 named "A", indicates that the communication distance therebetween is "3", and indicates that the amount of the communication data is "200". Furthermore, the example illustrated in FIG. 5 indicates that the VM guest 33 named "D" communicates with the VM guest 33 named "A", indicates that the communication distance therebetween is "3", and indicates that the amount of the communication data is "300". Furthermore, the example illustrated in FIG. 5 indicates that the VM guest 33 named "D" communicates with the VM guest 33 named "B", indicates that the communication distance therebetween is "10", and indicates that the amount of the communication data is "500".

A description will be given here by referring back to FIG. 2. The control unit 43 is an electronic circuit, such as a CPU that includes an internal memory or the like, and includes a VM host management unit 44, an acquiring unit 45, a specifying unit 46, and a move processing unit 47.

The VM host management unit 44 manages the VM host 32 and the VM guests 33 in each of the server devices 30. For example, the VM host management unit 44 communicates with the VM host 32 and the VM guests 33 in each of the server devices 30, specifies the VM host 32 and the VM guest 33 running on each of the server devices 30, and then updates the second table 42a.

The acquiring unit 45 stores, in the third table 42b, a hop count and the amount of communication data between each of the VM guests 33 that are received from the VM host 32 in each of the server devices 30 via the communication control I/F unit 41.

The specifying unit 46 specifies the communication distance between each of the server devices 30 on the basis of a hop count between each of the VM guests 33 stored in the third table 42b and on the basis of information on the server devices 30, in each of which the VM guests 33 are running, stored in the second table 42a.

FIG. 6 is a schematic diagram illustrating an example of the results in which the communication distances between server devices are specified. The example illustrated in FIG. 6 indicates that the communication distance between the server device 30 named "PM1" and the server device 30 named "PM2" is "5". Furthermore, the example illustrated in FIG. 6 indicates that the communication distance between the server device 30 named "PM1" and the server device 30 named "PM3" is "10". Furthermore, the example illustrated in FIG. 6 indicates that the communication distance between the server device 30 named "PM2" and the server device 30 named "PM3" is "3".

On the basis of the hop count and the amount of communication data between each of the VM guests 33 stored in the third table 42b, the specifying unit 46 searches for a pair of the VM guests 33 in which the amount of the communication data is equal to or greater than a predetermined amount and the communication distance is equal to or greater than a predetermined distance. The predetermined amount may also be defined as a fixed value, such as 200 bits, or defined as a constant rate of the total amount of the communication data passing through the network. Furthermore, the predetermined amount may also be changed in accordance with the state of the traffic in the network 21. The predetermined distance may also be defined as a fixed value, such as a hop count of, for example, 4 or may also be changed in accordance with the state of the traffic in the network 21. For example, if the traffic in the network 21 is high, a small value may be used and, if the traffic in the network 21 is low, a large value may be used. In this way, by obtaining a pair of the VM guests 33 whose communication distance is equal to or greater than the predetermined distance, it is possible to exclude, from being a candidate for a migration, the VM guest 33 in which the communication distance becomes less than the predetermined distance due to the previous migration. Furthermore, it is possible to exclude, from being a candidate for a move, the VM guest 33 in which the communication distance to the counterpart of the VM guest 33 is small and the effect of reducing traffic is low.

The specifying unit 46 specifies, as one of a pair of the VM guests 33 that have been searched, the VM guest 33 that is running in the server device 30 to which a low load is applied. Furthermore, the specifying unit 46 specifies, as the other one of the pair of the VM guests 33 that have been searched, the VM guest 33 that is running in the server device 30 to which a high load is applied. An example of the load includes the usage rate of a CPU or a memory. The load applied to each of the server devices 30 is acquired from the VM host management unit 44 when the VM host management unit 44 manages each of the server devices 30 and then collects the usage rate of its CPU or its memory. Furthermore, the load may also be acquired from each of the server devices 30 by the specifying unit 46 sending a request for the load to each of the server devices 30.

The specifying unit 46 calculates a change in the communication distance to one of the VM guests 33 that communicates with the other one of a pair of the VM guests 33 when the other VM guest 33 is moved to the server device 30 that executes the one of the pair of the VM guests 33. Specifically, the specifying unit 46 calculates a change in the communication distance when a pair of the VM guests 33 is collected and moved in the server device 30 to which a low load is applied. Then, if the communication distance is decreased by an amount equal to or greater than a predetermined value, the specifying unit 46 specifies the server device 30 that executes the one of the pair of the VM guests 33 as the server device 30 at the move destination.

In contrast, if the communication distance is not decreased by an amount equal to or greater than the predetermined value, the specifying unit 46 specifies the server devices 30, each of which the communication distance from the server device 30 that executes the one of a pair of the VM guests 33 is equal to or less than the predetermined distance and is shorter than the communication distance between the server devices 30 in each of which the pair of the VM guests 33 is running. The specifying unit 46 calculates a change in the communication distance to one of the VM guests 33 that communicates with the other one of the pair of the VM guests 33 when the other one of the pair of the VM guests 33 is moved to the specified server device 30. Then, the specifying unit 46 specifies, as the server device 30 at the move destination, the server device 30 in which the communication distance is decreased by an amount equal to or greater than the predetermined value. If the multiple server devices 30 are present whose communication distance is decreased by an amount equal to or greater than the predetermined, the specifying unit 46 specifies, as the server device 30 at the move destination, the server device 30 whose communication distance from the server devices 30 in which the one of the pair of the VM guests 33 are running is the shortest.

If the usage rate of a CPU in the server device 30 that is specified as the move destination is equal to or less than the predetermined value, the move processing unit 47 executes a process that moves the other VM guest 33 to the server device 30 at the move destination. As described above, by moving the other VM guest 33 when the usage rate of the CPU in the server device 30 at the move destination is equal to or less than the predetermined value, it is possible to prevent the VM guest 33 from being moved to the server device 30 to which a high load is applied.

Figure 7:
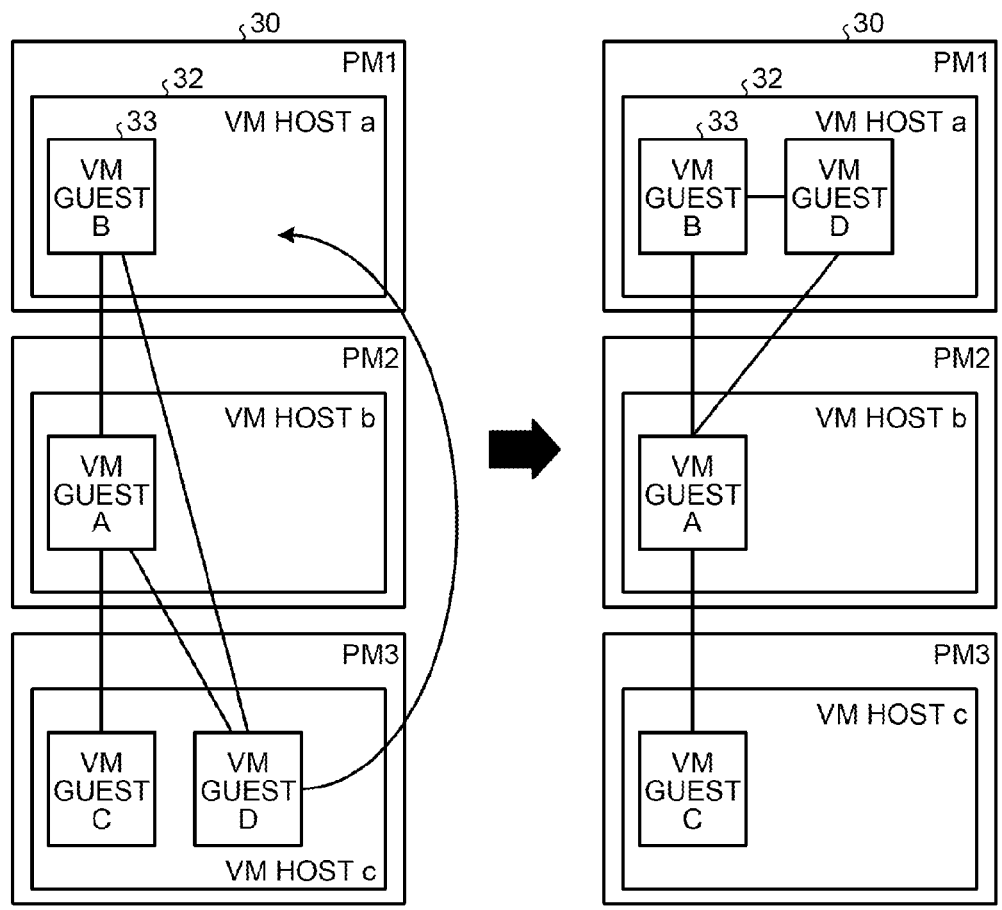
FIG. 7 is a schematic diagram illustrating an example of the flow in which a server device at the move destination is specified.

In the following, a description will be given of the flow in which the management server 40 specifies a server device at the move destination. FIG. 7 is a schematic diagram illustrating an example of the flow in which a server device at the move destination is specified. In the example illustrated in FIG. 7, as illustrated in FIG. 6, the communication distance between the server devices 30 named "PM1" and "PM2" is defined as "5", the communication distance between the server devices 30 named "PM1" and "PM3" is defined as "10", and the communication distance between the server devices 30 named "PM2" and "PM3" is defined as "3". Furthermore, the communication distance of the same server device 30 is defined as "1". Furthermore, in the example illustrated n FIG. 7, the VM guest 33 named "B" is running in the server device 30 named "PM1", the VM guest 33 named "A" is running in the server device 30 named "PM2", and the VM guests 33 each named "C" and named "D" are running in the server device 30 named "PM3". Furthermore, in the example illustrated in FIG. 7, the VM guests 33 each named "A" and "B" communicate with each other, the VM guests 33 each named "A" and "C" communicate with each other, the VM guests 33 each named "A" and "D" communicate with each other, and the VM guests 33 each named "B" and "D" communicate with each other. Furthermore, it is assumed that the amount of the communication data measured by each of the server devices 30 is defined as the value illustrated in FIG. 5.

Furthermore, it is assumed that the specifying unit 46 searches for a pair of the VM guests 33 in which the hop count between each of the VM guests 33 stored in the third table 42b is equal to or greater than "4" and the amount of the communication data stored in the third table 42b is equal to or greater than "200". In this case, as illustrated in FIG. 5, because the communication distance between the VM guests 33 named "B" and "D" is "10" and the amount of the communication data therebetween is "500", a pair of the VM guests 33 named "A" and "D" is searched. The number of pairs of the VM guests 33 to be searched by the specifying unit 46 increases as the predetermined value of the amount of the communication data becomes small or as the communication distance that is used to specify the move target becomes small, and thus the moving of the VM guest 33 tends to occur frequently.

In the following, a description will be given of a case in which the VM guest 33 named "D" is moved to the server device 30 named "PM1" in which the VM guest 33 named "B" is running. It is assumed that the predetermined value that is used when the specifying unit 46 specifies the server device 30 at the move destination is defined as "3".

The VM guest 33 named "D" communicates with the VM guests 33 each named "A" and "B". Consequently, the communication distance between the VM guests 33 named "B" and "D" and the communication distance between the VM guests 33 named "A" and "D" are changed due to the move, whereas the communication distance between the other VM guests 33 are not changed. Due to this move, the communication distance between the VM guests 33 named "B" and "D" is changed from 10 to 1 and the communication distance between the VM guests 33 named "A" and "D" is changed from 3 to 5. Consequently, the amount of change in the communication distance can be calculated as (10−1)+(3−5) =7 and thus the amount of change in the communication distance is greater than the predetermined value of "3". Consequently, the specifying unit 46 specifies the server device 30 named "PM1" as the server device 30, at the move destination, to which the VM guest 33 named "D" is moved.

Figure 8:
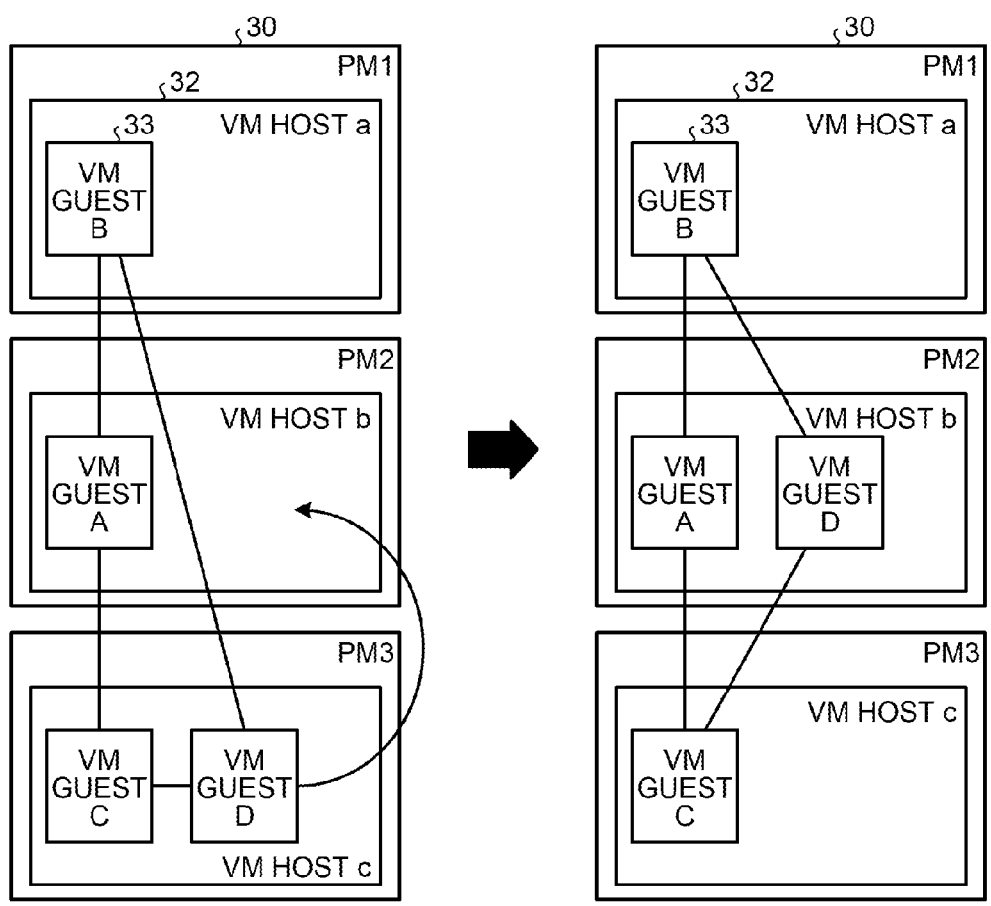
FIG. 8 is a schematic diagram illustrating another example of the flow in which the server device at the move destination is specified.

FIG. 8 is a schematic diagram illustrating another example of the flow in which the server device at the move destination is specified. In the example illustrated in FIG. 8, as illustrated in FIG. 6, the communication distance between the server devices 30 named "PM1" and "PM2" is defined as "5", the communication distance between the server devices 30 named "PM1" and "PM3" is defined as "10", and the communication distance between the server devices 30 named "PM2" and "PM3" is defined as "3". Furthermore, the communication distance of the same server device 30 is defined as "1". Furthermore, also in the example illustrated in FIG. 8, the VM guest 33 named "B" is running in the server device 30 named "PM1", the VM guest 33 named "A" is running in the server device 30 named "PM2", and the VM guests 33 each named "C" and "D" are running in the server device 30 named "PM3". Furthermore, in the example illustrated in FIG. 8, the VM guests 33 each named "A" and "B" communicate with each other, the VM guests 33 each named "A" and "C" communicate with each other, the VM guests 33 each named "B" and "D" communicate with each other, and the VM guests 33 each named "C" and "D" communicate with each other.

In the following, a description will be given of a case in which, for example, the VM guest 33 named "D" is moved to the server device 30 named "PM1". It is assumed that the predetermined value that is used when the specifying unit 46 specifies the server device 30 at the move destination is defined as "3". Due to this move, the communication distance between the VM guests 33 named "B" and "D" is changed from 10 to 1 and the communication distance between the VM guests 33 named "C" and "D" is changed 1 to 10. Consequently, the amount of change in the communication distance can be calculated as (10−1)+(1−10)=0 and thus the amount of change in the communication distance is smaller than the predetermined value of "3". Consequently, the specifying unit 46 does not specify the server device 30 named "PM1" as the server device 30, at the move destination, to which the VM guest 33 named "D" is moved.

In contrast, a description will be given of a case in which, for example, the VM guest 33 named "D" is moved to the server device 30 named "PM2". It is assumed that the predetermined value that is used when the specifying unit 46 specifies the server device 30 at the move destination is defined as "3". Due to this move, the communication distance between the VM guests 33 named "B" and "D" is changed from 10 to 5 and the communication distance between the VM guests 33 named "C" and "D" is changed from 1 to 3. Consequently, the amount of change in the communication distance can be calculated as (10−5)+(1−3)=3 and thus the amount of change in the communication distance is equal to or greater than the predetermined value of "3". Consequently, the specifying unit 46 specifies the server device 30 named "PM2" as the server device 30, at the move destination, to which the VM guest 33 named "D" is moved.

Figure 9:
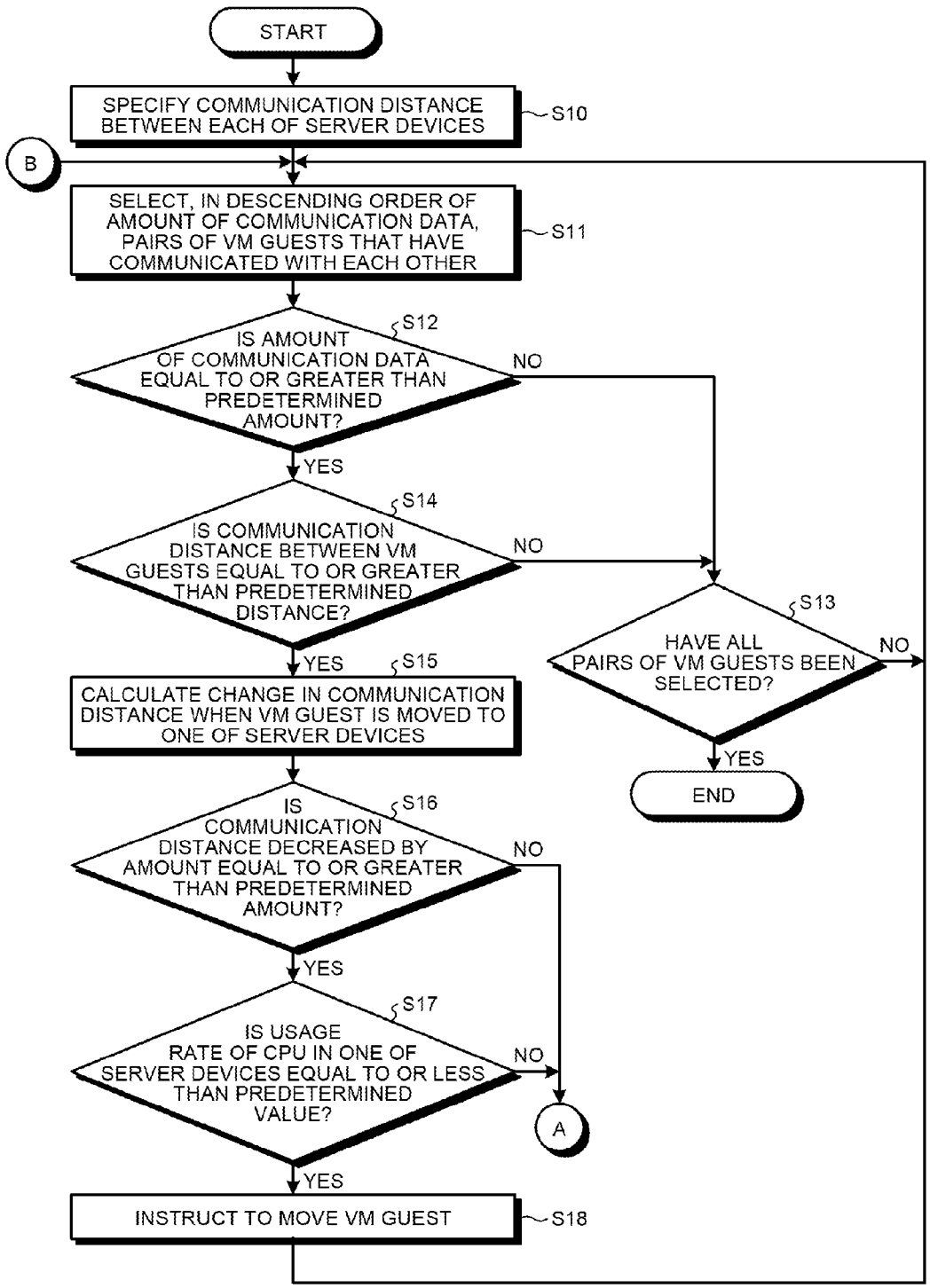
FIG. 9 is a flowchart illustrating the flow of a virtual machine move control process.
Figure 10:
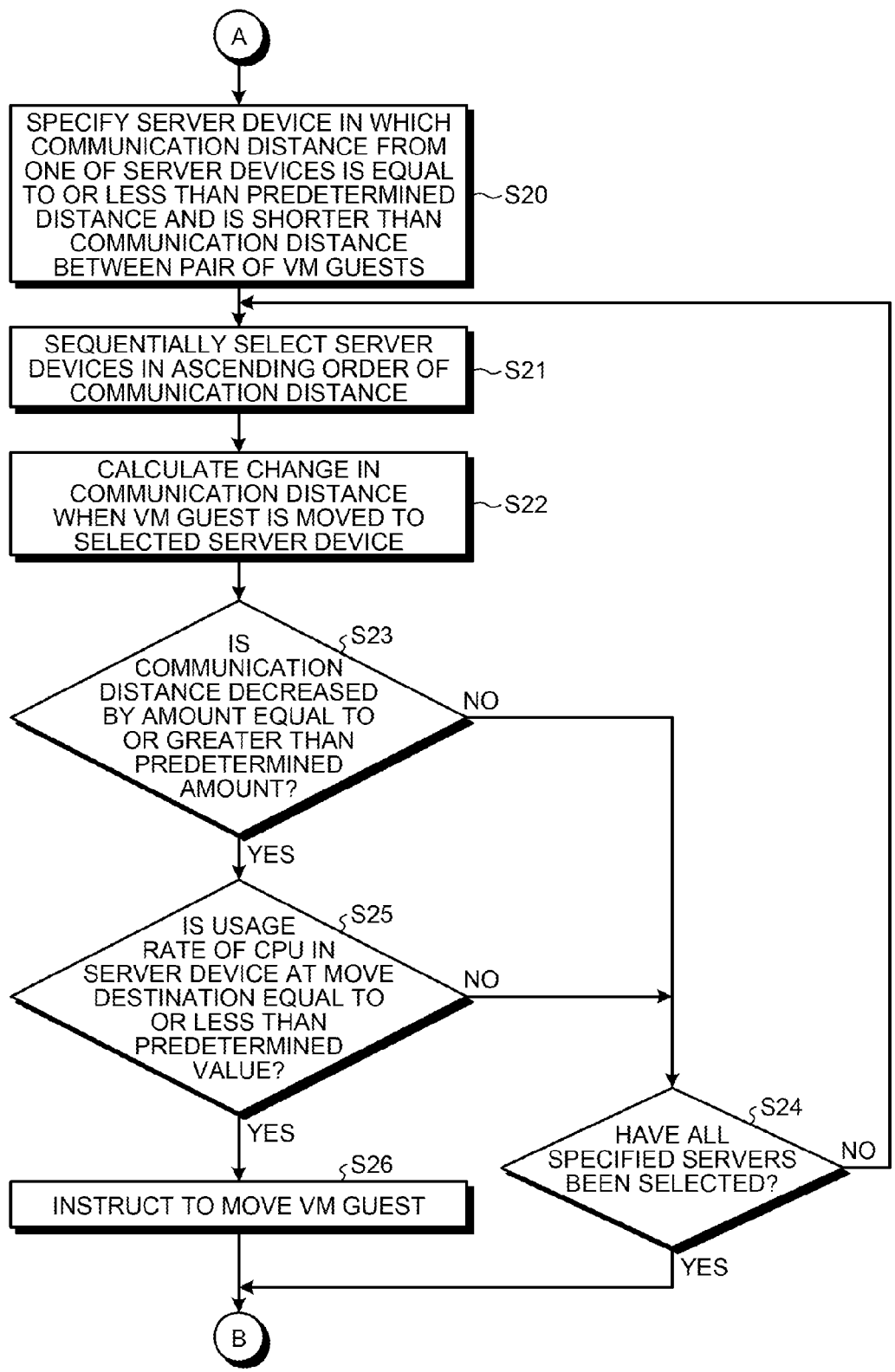
FIG. 10 is a flowchart illustrating the flow of a virtual machine move control process.

In the following, a description will be given of the flow of a process performed when the management server 40 according to the second embodiment specifies a server device at the move destination. FIGS. 9 and 10 are flowcharts each illustrating the flow of a virtual machine move control process. This virtual machine move control process is executed at a predetermined timing, such as every day or every week.

As illustrated in FIG. 9, the specifying unit 46 specifies the communication distance between each of the server devices 30 on the basis of the hop count between each of the VM guests 33 stored in the third table 42b and on the basis of the information on each of the VM guests 33 and the server device 30 stored in the second table 42a (Step S10). The specifying unit 46 sequentially selects pairs of the VM guests 33 that have communicated with each other from the third table 42b in the descending order of the amount of the communication data (Step S11). The specifying unit 46 determines whether the amount of the communication data exchanged between the selected pair of the VM guests 33 that have communicated with each other is equal to or greater than the predetermined amount (Step S12). If the amount of the communication data is less than the predetermined amount (No at Step S12), the specifying unit 46 determines whether all the pairs of the VM guests 33 that have communicated with each other have been selected (Step S13). If all of the pairs have been selected (Yes at Step S13), the specifying unit 46 ends the process. In contrast, if a pair that has not been selected is present (No at Step S13), the specifying unit 46 proceeds to Step S11.

In contrast, if the amount of the communication data is equal to or greater than the predetermined amount (Yes at Step S12), the specifying unit 46 determines whether the communication distance between a pair of the VM guests 33 is equal to or greater than the predetermined distance (Step S14). If the communication distance is less than the predetermined distance (No at Step S14), the specifying unit 46 proceeds to Step S13. If the communication distance is equal to or greater than the predetermined distance (Yes at Step S14), the specifying unit 46 calculates a change in the communication distance when the other one of the pair of the VM guests 33 running in the server device 30, to which a high load is applied, is moved to the server device 30 that executes the one of the pair of the VM guests 33 (Step S15). The specifying unit 46 determines whether the calculated communication distance is decreased by an amount equal to or greater than the predetermined value (Step S16). If the communication distance is not decreased by an amount equal to or greater than the predetermined value (No at Step S16), the process proceeds to Step S20. In contrast, if the communication distance is decreased by an amount equal to or greater than the predetermined value (Yes at Step S16), the move processing unit 47 determines whether the usage rate of the CPU in the server device 30 that executes the one of the pair of the VM guest 33 is equal to or less than the predetermined value (Step S17). If the usage rate of the CPU is not equal to or less than the predetermined value (No at Step S17), the process proceeds to Step S20. In contrast, if the usage rate of the CPU is equal to or less than the predetermined value (Yes at Step S17), the move processing unit 47 executes a process that moves the one of the VM guests 33 to the server device 30 in which the other one of the pair of the VM guests 33 is running (Step S18) and then proceeds to Step S11.

As illustrated in FIG. 10, the specifying unit 46 specifies each of the server devices 30 whose communication distance from the server device 30 that executes one of a pair of the VM guests 33 is equal to or less than the predetermined distance and is shorter than the communication distance between the server devices 30 in which the pair of the VM guests 33 are running (Step S20). The specifying unit 46 selects the server devices 30 that are sequentially specified in the ascending order of the communication distance from the server device 30 that executes the one of the pair of VM guests 33 (Step S21). The specifying unit 46 calculates a change in the communication distance between one of the VM guests 33 that is to be communicated with the other one of the pair of the VM guests 33 when the other one of the pair of the VM guests 33 is moved to the selected server device 30 (Step S22). The specifying unit 46 determines whether the calculated communication distance is decreased by an amount equal to or greater than the predetermined value (Step S23). If the communication distance is not decreased by an amount equal to or greater than the predetermined value (No at Step S23), the specifying unit 46 determines whether all of the specified server devices 30 have been selected (Step S24). If the server device 30 that has not been selected is present (No at Step S24), the specifying unit 46 proceeds to Step S21. In contrast, all of the server devices 30 have been selected, the specifying unit 46 proceeds to Step S11 illustrated in FIG. 9. In contrast, if the communication distance is decreased by an amount equal to or greater than the predetermined value (Yes at Step S23), the move processing unit 47 determines whether the usage rate of the CPU in the server device 30 that executes the one of the pair of the VM guests 33 is equal to or less than the predetermined value (Step S25). If the usage rate of the CPU is not equal to or less than the predetermined value (No at Step S25), the process proceeds to Step S24. In contrast, the usage rate of the CPU is equal to or less than the predetermined value (Yes at Step S25), the move processing unit 47 executes the process that moves the other one of the pair of the VM guests 33 to the selected server device 30 (Step S26) and then proceeds to Step S11 illustrated in FIG. 9.

As described above, the server device 30 specifies, as the server device 30 at the move destination, the server device whose communication distance to one of the VM guests 33, which communicates with the other one of a pair of the VM guests 33 when the other one of a pair of the VM guests 33 is moved, is decreased by an amount equal to or greater than the predetermined amount. Consequently, according to the server devices 30, it is possible to reduce the traffic in a network in the entirety system.

Furthermore, the server device 30 specifies the server device 30 that corresponds to the move destination for a pair of the VM guests 33 in which the amount of the communication data is equal to or greater than the predetermined amount and whose communication distance is equal to or greater than the predetermined distance. Consequently, according to the server devices 30, it is possible to extract the VM guest 33 that effectively reduces the traffic.

Furthermore, the server device 30 moves the VM guest 33 that is running in the server device 30, to which high load is applied, on the basis of the server device 30 to which a low load is applied and in which one of a pair of the VM guests 33 that are running in a pair of the server devices 30 is running. Consequently, according to the server devices 30, it is possible to reduce the load applied to the server device 30 to which a high load is applied.

Furthermore, the server device 30 determines, first, whether the VM guest 33, which is the other one of a pair of the VM guests 33, can be moved to the server device 30 in which one of the pair of the VM guests 33 is running. Consequently, according to the server devices 30, the VM guests 33 can be moved to close communication distance between a pair of the VM guests 33. Then, the server device 30 determines whether the VM guest 33 can be moved to the server device 30 that is closer to the server device 30 in which the one of the pair of the VM guests 33 is running. Consequently, according to the server devices 30, even if one of the pair of the VM guests 33 and the other one of the pair of the VM guests 33 are not able to be moved to the same server device 30, the pair of the VM guests 33 can be moved closer.

[c] Third Embodiment

In the above explanation, a description has been given of the embodiments of the device according to the present invention; however, the present invention can be implemented with various kinds of embodiments other than the embodiments described above. Therefore, another embodiment included in the present invention will be described below.

For example, in the embodiments described above, a description has been given of a case in which each of the server devices 30 sends the amount of communication data and the communication distance; however, the devices disclosed in the present invention is not limited thereto. For example, the management server 40 may also monitor a network and each of the server devices 30 may also acquire the amount of communication data and the communication distance.

Furthermore, the processes performed at steps described in each embodiment may be separated or integrated depending on various loads or use conditions. Furthermore, it may also possible to omit a step.

The components of each unit illustrated in the drawings are only for conceptually illustrating the functions thereof and are not always physically configured as illustrated in the drawings. In other words, the specific shape of a separate or integrated device is not limited to the drawings. Specifically, all or part of the device can be configured by functionally or physically separating or integrating any of the units depending on various loads or use conditions. For example, the processing units, i.e., the VM host management unit 44, the acquiring unit 45, and the specifying unit 46, illustrated in FIG. 2 may also be integrated as needed. Furthermore, the process performed by the specifying unit 46 may also be separated into two processes by using two units: a first specifying unit that performs a process for specifying the communication distance between the server devices and a second specifying unit that performs a process for specifying a server device whose communication distance is smaller than the specified communication distance. Furthermore, all or any part of the processing functions performed by each device can be implemented by a CPU and by programs analyzed and executed by the CPU or implemented as hardware by wired logic.

[Virtual Machine Move Control Program]

Figure 11:
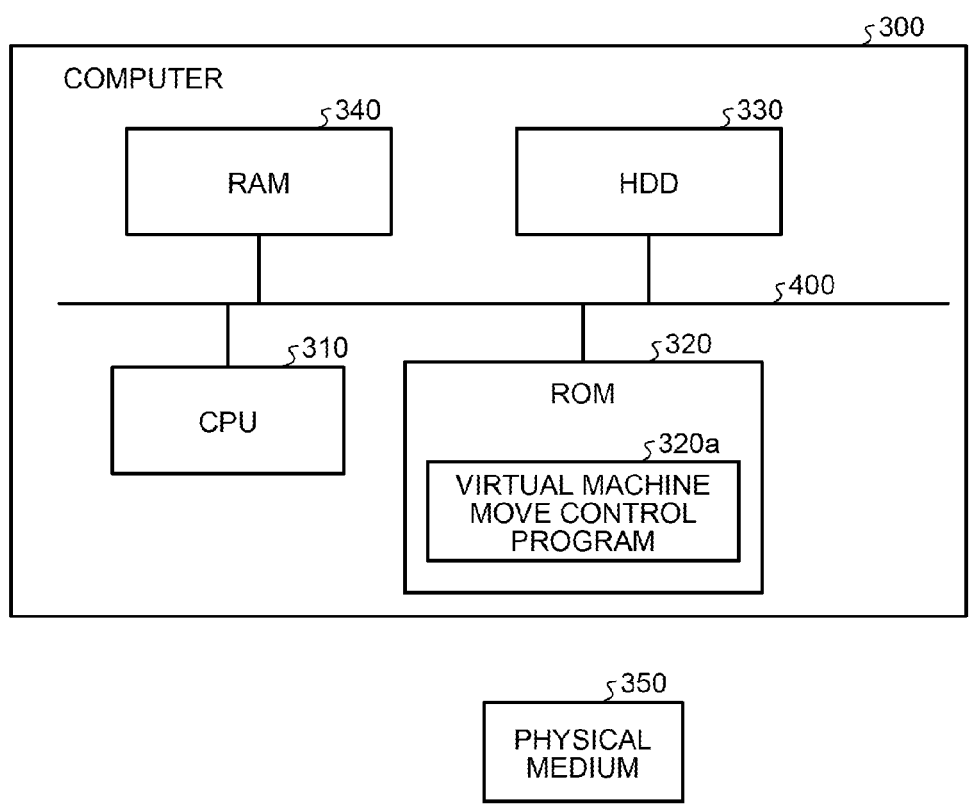
FIG. 11 is a block diagram illustrating a computer that executes a virtual machine move control program.

Furthermore, various processes described in the above embodiments can be implemented by program prepared in advance and executed by a computer system, such as a personal computer or a workstation. Accordingly, in the following, a description will be given of an example of a computer system that executes a program having the same function as that performed in the embodiments described above. FIG. 11 is a block diagram illustrating a computer that executes a virtual machine move control program.

As illustrated in FIG. 11, a computer 300 includes a central processing unit (CPU) 310, a read only memory (ROM) 320, a hard disk drive (HDD) 330, and a random access memory (RAM) 340. The units 300 to 340 are connected with each other via a bus 400. The HDD 330 stores therein a table having the same function as that in the second table 42a and the third table 42b illustrated in FIG. 2.

The ROM 320 stores therein, in advance, a virtual machine move control program 320a that is the same function as that performed by the specifying unit 14 and the move processing unit 15 described in the first embodiment or the specifying unit 46 and the move processing unit 47 described in the second embodiment. The virtual machine move control program 320a may also be appropriately separated.

Then, the CPU 310 reads the virtual machine move control program 320a from the ROM 320 and executes the program so that the virtual machine move control program 320a executes the same operation as that executed by each of the control units described in the first and the second embodiments. Specifically, the virtual machine move control program 320a executes the same operation as that executed by the specifying unit 14 and the move processing unit 15 described in the first embodiment or the specifying unit 46 and the move processing unit 47 described in the second embodiment.

Furthermore, the virtual machine move control program 320a described above does not need to be initially stored in the HDD 330.

For example, the program is stored in a portable physical medium 350, such as flexible disk (FD), a CD-ROM, a DVD disk, a magneto-optic disk, an IC CARD, or the like, that is to be inserted into the computer 300. Then, the computer 300 may read and execute the program from the portable physical medium.

Alternatively, the program may also be stored in "another computer (or a server)" connected to the computer 300 via a public circuit, the Internet, a LAN, a WAN, or the like. Then, the computer 300 may also read and execute the program from the other computer.

According to an aspect of an embodiment of the present invention, an advantage is provided in that it is possible to suppress the occurrence of a delay in a network.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A virtual machine management device comprising:
    an acquiring unit that acquires an amount of communication data that is exchanged between multiple virtual machines running in multiple server devices and that is used for communication with each other;
    a specifying unit that extracts a server device that executes one of a pair of the virtual machines whose amount of communication data is equal to or greater than a predetermined amount, and that specifies, on the basis of a communication distance between each of the server devices in which virtual machines are running, a server device that has a shorter communication distance from the extracted server device than a communication distance between server devices in which the pair of the virtual machines are running, and that has a sum of communication distances between the other one of the pair of the virtual machines and virtual machines, including the one of the pair of the virtual machines, connected to the other one of the pair of the virtual machines that decreases greater than a predetermined distance when the other one of the pair of the virtual machines is moved; and
    a move processing unit that moves the other one of the pair of the virtual machines to the server device that has been specified by the specifying unit.

2. The virtual machine management device according to claim 1, wherein
    the acquiring unit acquires, from each of the server devices, information related to the communication distance, and
    the specifying unit specifies the communication distance between each of the server devices on the basis of the information acquired from each of the server devices.

3. The virtual machine management device according to claim 1, wherein the specifying unit specifies a server device in which a communication distance between one of the virtual machines and the other one of the pair of the virtual machines is decreased by an amount equal to or greater than a predetermined value when the other one of the pair of the virtual machines is moved and in which a communication distance from the server device that executes the one of the pair of the virtual machines is shorter than the communication distance between the server devices in which the pair of the virtual machines are running.

4. The virtual machine management device according to claim 1, wherein the specifying unit specifies a pair of virtual machines whose amount of communication data is equal to or greater than the predetermined amount and the communication distance is equal to or greater than a predetermined distance.

5. The virtual machine management device according to claim 1, wherein the specifying unit sets the virtual machine, as the one of the pair of the virtual machines, that is running in a first server device whose load is lower among the server devices in which the pair of the virtual machines are running, sets the virtual machine, as the other one of the pair of the virtual machines, that is running in a second server device whose load is higher among the server devices in which the pair of the virtual machines are running, and specifies a server device that has a shorter communication distance from the first server device than the communication distance between the first server device and the second server device.

6. A non-transitory computer-readable recording medium having stored therein a virtual machine move control program for causing a computer to execute a process, the process comprising:
    extracting a server device that executes one of a pair of the virtual machines whose amount of communication data is equal to or greater than a predetermined amount;
    specifying, on the basis of a communication distance between each of server devices in which virtual machines are running, a server device that has a shorter communication distance from the extracted server device than a communication distance between server devices in which the pair of the virtual machines are running, and that has a sum of communication distances between the other one of the pair of the virtual machines and virtual machines, including the one of the pair of the virtual machines, connected to the other one of the pair of the virtual machines that decreases greater than a predetermined distance when the other one of the pair of the virtual machines is moved; and
    moving the other one of the pair of the virtual machines to the specified server device.

7. A virtual machine move control method executed by a computer, the virtual machine move control method comprising:
    extracting a server device that executes one of a pair of the virtual machines whose amount of communication data is equal to or greater than a predetermined amount;
    specifying, on the basis of a communication distance between each of server devices in which virtual machines are running, a server device that has a shorter communication distance from the extracted server device than a communication distance between server devices in which the pair of the virtual machines are running, and that has a sum of communication distances between the other one of the pair of the virtual machines and virtual machines, including the one of the pair of the virtual machines, connected to the other one of the pair of the virtual machines that decreases greater than a predetermined distance when the other one of the pair of the virtual machines is moved; and
    moving the other one of the pair of the virtual machines to the specified server device.

* * * * *